(12) United States Patent
Vuori

(10) Patent No.: US 9,307,367 B2
(45) Date of Patent: *Apr. 5, 2016

(54) METHOD AND DEVICES FOR FACILITATING THE LOCATION OF A MOBILE ELECTRONIC DEVICE

(71) Applicant: Nokia Technologies Oy, Espoo (FI)

(72) Inventor: Janne Vuori, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,288

(22) Filed: Feb. 26, 2014

(65) Prior Publication Data

US 2014/0179349 A1    Jun. 26, 2014

Related U.S. Application Data

(63) Continuation of application No. 12/307,353, filed as application No. PCT/EP2006/006576 on Jul. 3, 2006, now Pat. No. 8,694,019.

(51) Int. Cl.
| | | |
|---|---|---|
| *H04W 24/00* | (2009.01) | |
| *H04W 4/02* | (2009.01) | |
| *G01S 19/51* | (2010.01) | |
| *H04W 8/14* | (2009.01) | |
| *H04W 64/00* | (2009.01) | |
| *H04W 88/02* | (2009.01) | |
| *H04W 92/18* | (2009.01) | |

(52) U.S. Cl.
CPC .............. *H04W 4/028* (2013.01); *G01S 19/51* (2013.01); *H04W 8/14* (2013.01); *H04W 4/02* (2013.01); *H04W 64/00* (2013.01); *H04W 88/02* (2013.01); *H04W 92/18* (2013.01)

(58) Field of Classification Search
CPC ........................................... H04W 4/00–4/046
See application file for complete search history.

(56) References Cited

U.S. PATENT DOCUMENTS

| 7,260,835 B2 | 8/2007 | Bajikar |
| 7,474,896 B2 | 1/2009 | Mohi et al. |

(Continued)

FOREIGN PATENT DOCUMENTS

| GB | 2380080 | 3/2003 |
| GB | 2390510 | 1/2004 |

(Continued)

OTHER PUBLICATIONS

International Search Report for International Application No. PCT/EP2006/006576.

*Primary Examiner* — San Htun
(74) *Attorney, Agent, or Firm* — Locke Lord LLP

(57) ABSTRACT

The invention relates to a user-portable electronic device and in particular one which is capable of establishing transmission connection with one or more mobile electronic devices. A user-portable electronic device comprising: transmission connection circuitry arranged to establish transmission connection between the user-portable electronic device and one or more mobile electronic devices; geographic-location determining circuitry arranged to determine a geographic location of the or each mobile electronic device associated with transmission connection of the user-portable electronic device and the or each mobile electronic device; and log circuitry arranged to allow storage of a geographic-location log including at least a last-known geographic location of the or each mobile electronic device.

20 Claims, 9 Drawing Sheets

(56) References Cited

U.S. PATENT DOCUMENTS

| | | |
|---|---|---|
| 2001/0034244 A1 | 10/2001 | Calder et al. |
| 2002/0115445 A1* | 8/2002 | Myllymaki ............ H04W 4/02 455/456.3 |
| 2002/0194500 A1* | 12/2002 | Bajikar ..................... 713/201 |
| 2003/0008659 A1* | 1/2003 | Waters et al. .............. 455/456 |
| 2003/0018744 A1 | 1/2003 | Johanson et al. |
| 2003/0195008 A1* | 10/2003 | Mohi et al. ............. 455/456.5 |
| 2006/0009240 A1* | 1/2006 | Katz ..................... G01S 5/0289 455/457 |
| 2006/0270421 A1 | 11/2006 | Phillips et al. |

FOREIGN PATENT DOCUMENTS

| | | |
|---|---|---|
| WO | WO2004100580 | 11/2004 |
| WO | WO2006049603 | 5/2006 |

* cited by examiner

| Record | Device name | Location | Date | Time | Connection media |
|---|---|---|---|---|---|
| 1 | Headset1 | 39.3° N 76.6° W | 13/06/06 | 14:31 | Bluetooth |
| | | 39.7° N 76.6° W | 16/06/06 | 09:12 | Bluetooth |
| | | 40.0° N 76.6° W | 25/06/06 | 10:11 | Bluetooth |

Figure 6

METHOD AND DEVICES FOR FACILITATING THE LOCATION OF A MOBILE ELECTRONIC DEVICE

This application is a continuation of U.S. application Ser. No. 12/307,353, filed Jun. 23, 2009, which is a National Stage Entry of International application No. PCT/EP2006/006576, filed Jul. 3, 2006, and of which the entire contents are incorporated herein by reference.

The invention relates to a user-portable electronic device and in particular one which is capable of establishing transmission connection with one or more mobile electronic devices. Both types of electronic device do not have a fixed geographic location. The user-portable electronic device is user portable in the sense that it can be carried by a user, and may be a mobile phone, a laptop or a personal digital assistant, for example. The mobile electronic device is not necessarily user portable, and may be a car with a built-in hands-free kit, for example. More specifically, the invention relates to facilitating the location of the user-portable device and/or mobile electronic devices.

BACKGROUND OF THE INVENTION

Users typically have many mobile electronic devices which can easily be misplaced, lost or stolen. Currently, there is no adequate means whereby a user is able to determine when or where a mobile electronic device was last located.

SUMMARY OF THE INVENTION

According to a first aspect of the invention, there is provided a user-portable electronic device comprising
 transmission connection circuitry arranged to establish transmission connection between the user-portable electronic device and one or more mobile electronic devices;
 geographic-location determining circuitry arranged to determine a geographic location of the or each mobile electronic device associated with transmission connection of the user-portable electronic device and the or each mobile electronic device; and
 log circuitry arranged to allow storage of a geographic-location log including at least a last-known geographic location of the or each mobile electronic device.

The last known geographic location may be the location when the connection was originally established.

The last known location of the or each mobile device may be based on where the connection was last active, disconnected or lost. This would be particularly beneficial as movement of the devices may occur during connection.

Transmission connection is thus used to keep a log of the geographic locations of the or each mobile electronic device. This can then be used to retrieve the geographic location of the or each mobile electronic device, for example, if the mobile electronic device has been misplaced.

In one embodiment, the user-portable electronic device is a mobile telephone and the mobile electronic devices are peripheral devices such as headsets and hands-free kits. However, it should be understood that the invention is application to any electronic device which is capable of establishing wired or wireless communications with any other electronic device, provided that at least one of the electronic devices is capable of determining (directly or indirectly) its geographic location.

The term "transmission connection" relates to any form of physical or non-physical "wired" or "wireless" communication between the devices, and may include paging operations and/or the transfer of (e.g. payload) data, for example. Transmission connection allows the transmission of signals (e.g. electrical/optical/radio) between the mobile electronic device and the user-portable electronic device.

The user-portable electronic device may include user-interface circuitry arranged to allow a user to access the geographic-location log in order to facilitate location of the or each mobile electronic device. Additionally or alternatively, the user may be able to access the geographic-location log using user-interface circuitry which is physically remote from the user-portable electronic device, for example by accessing the log using a personal computer.

The term "geographic location" relates to one or both of a 2D/3D locus or regional area in space, i.e. geographical positional information.

The geographic-location determining circuitry may be arranged to receive geographic-location data from the or each mobile electronic device when said transmission connection is established.

The geographic-location determining circuitry may be arranged to receive geographic-location data from the or each mobile electronic device when said transmission connection is active. The geographic-location determining circuitry may be arranged to receive geographic-location data from the or each mobile electronic device based on the (e.g. user-initiation of/automatic/out-of-range) disconnection between the user-portable electronic device and the or mobile electronic device.

Additionally or alternatively, the geographic-location determining circuitry may be arranged to determine a geographic location of the user-portable device and to determine the geographic-location of the or each mobile electronic device based on the determined geographic location of the user-portable device and a range of the transmission connection between the user-portable electronic device and the or each mobile electronic device. The term "based on" may relate to the actual location of the mobile electronic device and/or the user-portable electronic device as the mobile electronic device must be in some proximity during transmission connection.

The log circuitry may include storage circuitry arranged to store the geographic-location log. Additionally or alternatively, the log circuitry may be arranged to communicate (by wired and/or wireless means) with remote storage circuitry which is capable of storing the geographic-location log. Additionally or alternatively, the log circuitry may be arranged to communicate with removable storage circuitry which is capable of storing the geographic-location log. For example, the remote storage circuitry may form part of a network server or a personal computer which is physically remote from the user-portable electronic device. The removable storage circuitry may be a memory stick, for example, which can be removed from the user-portable electronic device.

The log circuitry may be arranged to allow storage in the geographic-location log of a history of geographic locations of the or each mobile electronic device.

The log circuitry may be arranged to allow storage of a time at which the or each geographic location of the or each mobile electronic device was determined.

The user-portable electronic device may be a master device or a slave device and the or each mobile electronic device may be a master device or a slave device.

The user-interface circuitry may be arranged to allow sorting of entries in the geographic-location log. The user-interface circuitry may be operable to allow searching of entries in the geographic-location log. The entries may be sorted or searched based on a regularity of transmission connection with a particular mobile electronic device, a name of a mobile electronic device, a location, a time, and/or transmission connection settings, for example Bluetooth™ settings dialogue. The user-portable may include processing circuitry arranged to perform the sorting and/or searching operations. The processing circuitry may be comprised with the log circuitry and/or user-interface circuitry.

The user-portable electronic device may comprise cartographic circuitry and display circuitry arranged to display a map indicating the last-known geographic location of the mobile electronic device.

The geographic-location determining circuitry may be arranged to determine the geographic location of the or each mobile electronic device during transmission connection upon initiation by the user. Additionally or alternatively, the geographic-location determining circuitry may be arranged to determine the geographic location of the or each mobile electronic device during transmission connection automatically.

According to a second aspect of the invention, there is provided a user-portable electronic device comprising
   means for establishing transmission connection between the user-portable electronic device and one or more mobile electronic devices;
   means for determining a geographic location of the or each mobile electronic device associated with transmission connection of the user-portable electronic device and the or each mobile electronic device; and
   means for allowing storage of a geographic-location log including at least a last-known geographic location of the or each mobile electronic device.

According to a third aspect of the invention, there is provided a module for a user-portable electronic device, the module comprising
   transmission connection circuitry arranged to establish transmission connection between the user-portable electronic device and one or more mobile electronic devices;
   geographic-location determining circuitry arranged to determine a geographic location of the or each mobile electronic device associated with transmission connection of the user-portable electronic device and the or each mobile electronic device; and
   log circuitry arranged to allow storage of a geographic-location log including at least a last-known geographic location of the or each mobile electronic device.

According to a fourth aspect of the invention, there is provided a module for a user-portable electronic device, the module comprising
   means for establishing transmission connection between the user-portable electronic device and one or more mobile electronic devices;
   means for determining a geographic location of the or each mobile electronic device associated with transmission connection of the user-portable electronic device and the or each mobile electronic device; and
   means for allowing storage of a geographic-location log including at least a last-known geographic location of the or each mobile electronic device.

According to a fifth aspect of the invention, there is provided a network apparatus comprising
   storage circuitry arranged to store a geographic-location log including at least a last-known geographic location of one or more mobile electronic devices.

According to a sixth aspect of the invention, there is provided a method of facilitating location of a mobile electronic device, the method comprising
   establishing transmission connection between a user-portable electronic device and the mobile electronic device;
   determining a geographic location of the mobile electronic device associated with transmission connection of the user-portable electronic device and the mobile electronic device; and
   allowing storage of a geographic-location log including at least a last-known geographic location of the mobile electronic device.

Any circuitry of the user-portable electronic device or module according to the invention may include one or more processors, memories and bus lines. One or more of the circuitries described may share circuitry elements.

The present invention includes one or more aspects, embodiments and/or features of said aspects and/or embodiments in isolation and/or in various combinations whether or not specifically stated (including claimed) in that combination or in isolation.

BRIEF DESCRIPTION OF THE DRAWINGS

In order that the invention may more readily be understood, a description is now given, by way of example only, reference being made to the accompanying drawings, in which:

FIG. 6 shows a variant of the geographic-location log of FIG. 3;

DETAILED DESCRIPTION OF THE INVENTION

Figure 1:
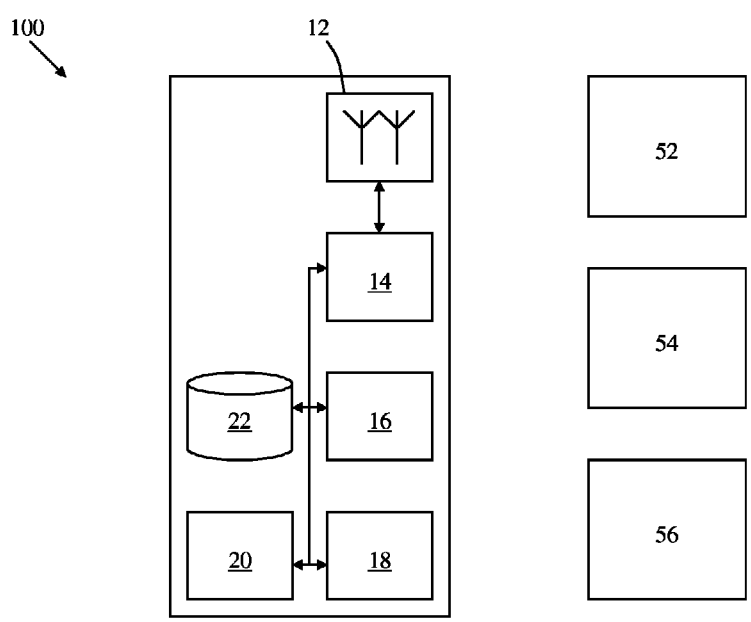
FIG. 1 is a schematic diagram of a first embodiment of a user-portable electronic device according to the invention.

FIG. 1 is a schematic diagram of a first embodiment of a user-portable electronic device 100 having an antenna module 12, transmission connection circuitry 14, geographic-location determining circuitry 16, log circuitry 18, user-interface circuitry 20 and storage circuitry 22.

The transmission connection circuitry 14 is arranged to establish transmission connection via the antenna module 12 between the user-portable electronic device 100 and one or more mobile electronic devices 52-56, such as headsets or hands-free kits, for example, and also to communicate with positioning systems such as GPS satellites (not shown).

Figure 2:
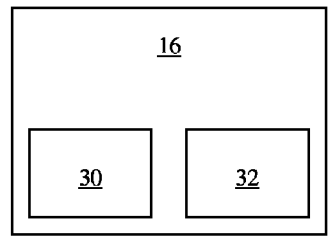
FIG. 2 shows geographic-location determining circuitry according to the invention.

The geographic-location determining circuitry 16 is arranged to determine the geographic location of a mobile electronic device 52-56 when the user-portable electronic device 100 connects to that mobile electronic device 52-56. With mobile electronic devices 52-56 that include position-determining circuitry, such as a GPS module, the geographic-location determining circuitry 16 receives geographic-location data from the mobile electronic device 52-56 during the connection to that mobile electronic device 52-56. With mobile electronic devices 52-56 that do not include position-determining circuitry, the geographic-location determining circuitry 16 determines its own geographic location (i.e. that of the user-portable device 100) and calculates the geographic location of the mobile electronic device 52-56 based on its own geographic location and a range of the transmission connection between the user-portable electronic device 100 and the mobile electronic device 52-56. To this end, as shown in FIG. 2, the geographic-location determining circuitry 16 includes a GPS module 30 and a cell ID module 32 whereby it obtains geographic location data. For example, in the case that the user-portable electronic device 100 connects to a Bluetooth™ headset, the geographic-location determining circuitry 16 determines its own geographic location and calculates the geographic location of the headset as the area within a 10 m radius of its own geographic location, 10 m being the range within which transmission connection can be established with the Bluetooth™ headset.

Figure 3:
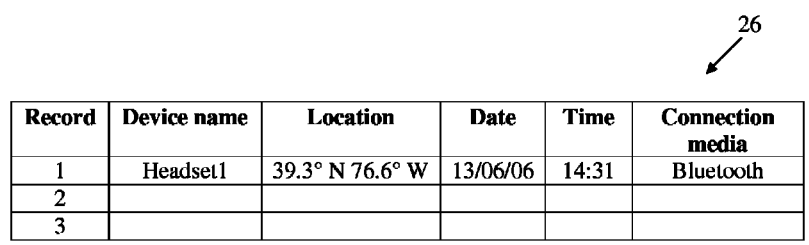
FIG. 3 shows a geographic-location log according to the invention.

The log circuitry 18 is arranged to allow storage of a geographic-location log 26, as shown in FIG. 3, including a last-known geographic location of each mobile electronic device 52-56 whose geographic location has been determined by the geographic-location determining circuitry 16. Each record of the log 26 includes fields describing the name or other identifiers (for example, the physical IP/MAC/Bluetooth™ address) of the mobile electronic device 52-56 to which the user-portable electronic device 100 has been connected, the geographic location of the mobile electronic device 52-56 as determined by the geographic-location determining circuitry 16 at the time of the transmission connection, the date of the transmission connection, the time of the transmission connection, and the transmission connection media, for example via Bluetooth™ or wireless local area network WLAN. In this embodiment, the log 26 is stored in the storage circuitry 22. The log in FIG. 3 is an active log indicating which device is currently connected.

The user-interface circuitry 20 allows the user to access the geographic-location log 26 in order to facilitate location of the mobile electronic devices 52-56. The user-interface circuitry 20 can be used to sort or search entries in the geographic-location log 26. The entries may be sorted or searched based on a regularity of transmission connection with a particular mobile electronic device 52-56 (i.e. the entries are presented according to connection frequency), a name of a mobile electronic device 52-56, a location, a time, and/or transmission connection settings.

Figure 4:
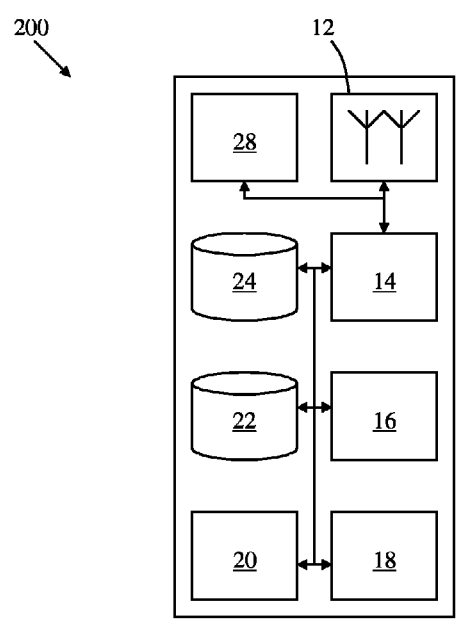
FIG. 4 is a schematic diagram of a second embodiment of a user-portable electronic device according to the invention.

FIG. 4 shows a second embodiment of a user-portable electronic device 200 which includes, in addition to the elements of user-portable electronic device 100 (the antenna module 12, transmission connection circuitry 14, geographic-location determining circuitry 16, log circuitry 18, user-interface circuitry 20 and storage circuitry 22), removable storage circuitry 24 and an electrical connector 28. The log circuitry 18 is arranged to communicate with the removable storage circuitry 24, which stores the geographic-location log 26. In this embodiment, the removable storage circuitry 24 is a memory stick. The electrical connector 28 is used for wired/physical transmission connection to mobile electronic devices 52-56. In the case that wired transmission connection is established between the user-portable electronic device 200 and a mobile electronic device 52-56 which cannot determine its geographic location, the geographic-location determining circuitry 16 uses its own geographic location as that of the mobile electronic device 52-56.

Figure 5:
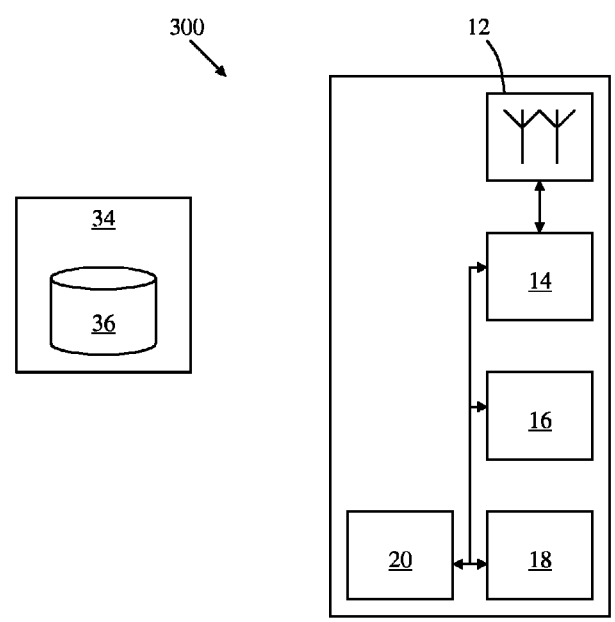
FIG. 5 is a schematic diagram of a third embodiment of a user-portable electronic device according to the invention.

In a third embodiment, as shown in FIG. 5, user-portable electronic device 300 does not include the storage circuitry 22 or removable storage circuitry 24, but instead the log circuitry 18 communicates via the transmission connection circuitry 14 and antenna module 12 with remote electronic device 34 having remote storage circuitry 36. The remote storage circuitry stores the geographic-location log 26. The remote storage circuitry 36 may form part of a network server or a personal computer. In this way, the user can use the personal computer to access the log 26 in order to locate mobile electronic devices 52-56 to which the user portable electronic device 300 has connected, or even to locate the user-portable electronic device itself, since the geographic locations of the mobile electronic devices 52-56 will be indicative of, or even identical to, the geographic locations of the user-portable electronic device 300. This will facilitate location of the mobile electronic device 52-56 independently of the user-portable electronic device 300. In a further variant, the log 26 is stored in multiple locations including any of the storage circuitry 22, removable storage circuitry 24 and remote storage circuitry 36.

FIG. 6 shows a variant of the geographic-location log 26. In the variant, the log 26 includes a history of the geographic locations of a particular mobile electronic device 52-56 (i.e. the log is a historical log available after disconnection of the devices). As seen, the log 26 records the geographic location of the mobile electronic device 52-56, in this case a Bluetooth™ headset, each time a transmission connection with that device is made, along with the date and time of the transmission connection and the transmission connection media used. The user may search through the history in order to trace his movements.

It will be appreciated that the data table in FIG. 6 is only one example, and that other data formats could be used, such as date in differing formats and location in differing formats other than just Latitude/Longitude (for example, UTM, UK National grid, Irish grid etc). UTM is Universal Transverse Mercator Projection (UTM) based on spheroid International (1924), UK National Projection is based on Spheroid Airy and Irish grid is based on the Spheroid Airy (modified).

Figure 7:
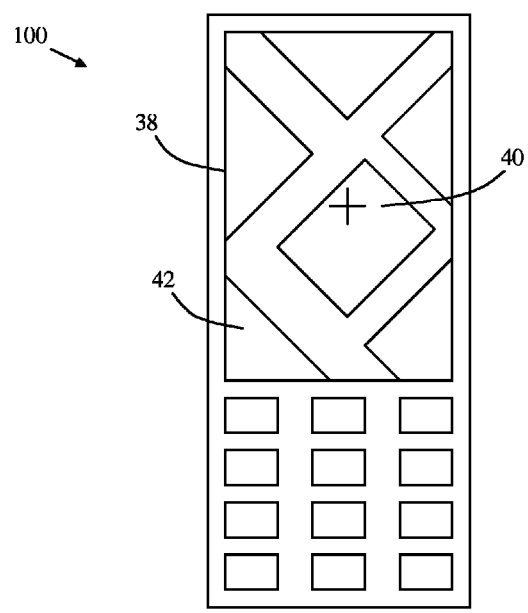
FIG. 7 shows a user-portable electronic device according to the invention displaying a map.

FIG. 7 shows a user-portable electronic device 100 having a display 38 displaying a map 42. A crosshair 40 indicates the last-known geographic location of a mobile electronic device 52-56 to which the user-portable electronic device 100 connected, the crosshair 40 indicating the geographic location on the map 42, such that the user can readily identify the geographic location. The particular mobile electronic device 52-56 for which geographic location information is required is selectable by the user via the user-interface circuitry 20.

For example, a user who has forgotten where he parked his car can use the user-portable electronic device 100 to display on the map 42 the last-known geographic location of a headset which he uses in his car (and which was last connected when in the car), thereby to discover the location of the car. Similarly, the previous connection of the device 100 to the built-in hands-free kit of the car can be used to determine the location of the car.

Figure 8:
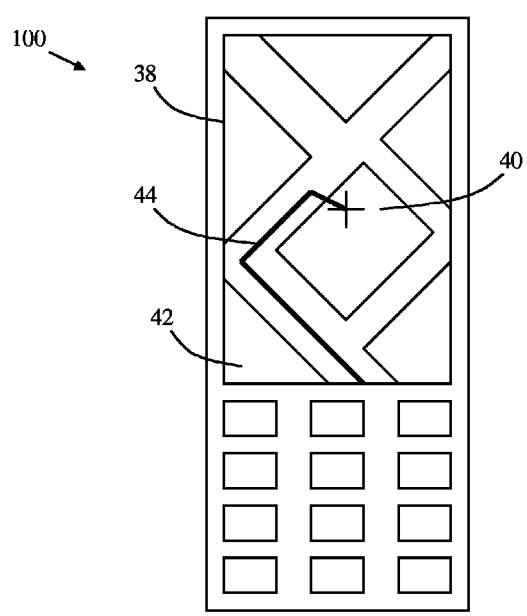
FIG. 8 shows the user-portable electronic device of FIG. 7 further displaying a trace.

FIG. 8 shows the same user-portable electronic device 100 with map 42 and crosshair 40 displayed on the display 38. Further displayed is a trace 44 representing a history of the geographic locations of the mobile electronic device 52-56.

Figure 9:
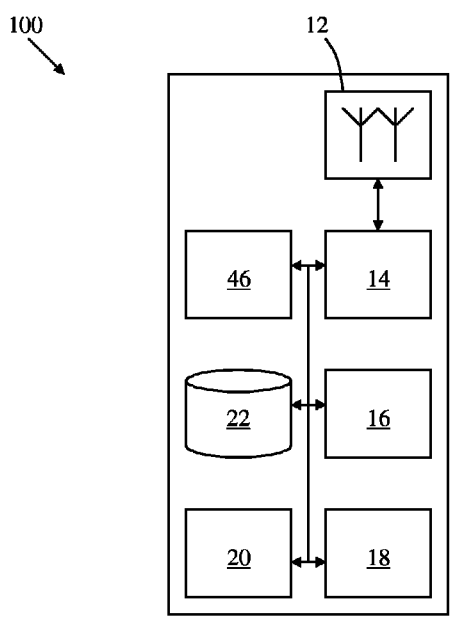
FIG. 9 shows a user-portable device according to the invention including cartographic circuitry.

For the purposes of displaying the maps shown in FIGS. 7 and 8, the user-portable electronic device 100 may include cartographic circuitry 46, as shown in FIG. 9.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus comprising:
   at least one processor; and
   at least one memory including computer program code,
   the at least one memory and the computer program code configured to, with the at least one processor, cause the apparatus to perform at least the following:
   allow for one or more of storage and searching of a user-searchable geographic-location log to facilitate subsequent location of one or more mobile electronic devices by a user without connection to the one or more mobile electronic devices, the user-searchable geographic-location log including at least the name or other identifier of the one or more mobile electronic devices, an indication of a last-known geographic location of the one or more mobile electronic devices, the time and date of the last-known geographic location of the one or more mobile electronic devices, and the transmission connection media used at the time of the last-known geographic location of the one or more mobile electronic devices, the user-searchable geographic-location log configured to allow for display of a user-searched last-known geographic location of the one or more mobile electronic devices;
   the last-known geographic location of the one or more mobile electronic devices determined based on disconnection or loss of transmission connection between a user-portable electronic device and the one or more mobile electronic devices.

2. The apparatus of claim 1, wherein the apparatus is configured to allow storage of the user-searchable geographic-location log including the last-known geographic location of the one or more mobile electronic devices determined based on the determined geographic location of the user-portable electronic device and a range of the transmission connection between the user-portable electronic device and the one or more mobile electronic devices.

3. The apparatus of claim 1, wherein the apparatus comprises transmission connection circuitry configured to be able to establish transmission connection between the user-portable electronic device and the one or more mobile electronic devices.

4. The apparatus of claim 1, wherein the apparatus is configured to allow a user to access the user-searchable geographic-location log in order to facilitate location of the one or more mobile electronic devices.

5. The apparatus of claim 1, wherein the apparatus is configured to allow one or more of:
   sorting of entries in the user-searchable geographic-location log; and
   searching of entries in the user-searchable geographic-location log.

6. The apparatus of claim 1, wherein the apparatus is configured to allow storage of one or more of the following in the user-searchable geographic-location log:
   the name or other identifier of the one or more mobile electronic devices;
   an indication of the last-known geographic location of the one or more mobile electronic device
   the time and date of the last-known geographic location of the one or more mobile electronic devices; and
   the transmission connection media used at the time of the last-known geographic location of the one or more mobile electronic devices.

7. The apparatus of claim 1, wherein the apparatus is configured to allow storage of a history of geographic locations of the one or more mobile electronic devices in the user-searchable geographic-location log.

8. The apparatus of claim 1, wherein the apparatus is configured to allow storage of one or more times at which one or more geographic locations of the one or more mobile electronic device was determined in the user-searchable geographic-location log.

9. The apparatus of claim 1, wherein the apparatus is configured to allow for display of a user-searched last-known geographic location of the one or more mobile electronic devices obtained from the user-searchable geographic-location log.

10. The apparatus of claim 1, wherein the apparatus is configured to use user-searchable geographic-location data received from the one or more mobile electronic devices when said transmission connection is one or more of established and active.

11. The apparatus of claim 1, wherein the user-searchable geographic-location log is stored at one or more of:
    the user-portable electronic device;
    a remote storage means located remotely from the user-portable electronic device; and
    a removable storage means of the user-portable electronic device.

12. The apparatus of claim 1, wherein the user-portable electronic device is a master device or a slave device and each of the one or more mobile electronic devices is a master device or a slave device.

13. The apparatus of claim 1, wherein the apparatus is configured to store the user-searchable geographic-location log of the one or more mobile electronic devices in a format allowing the last-known geographic location of the one or more mobile electronic devices to be indicated on a map.

14. The apparatus of claim 1, wherein the apparatus is configured to allow storage of the user-searchable geographic-location log including the determined geographic location of the one or more mobile electronic devices during:
    transmission connection upon initiation by a user, and/or
    automatic transmission connection.

15. The apparatus of claim 1, wherein the apparatus is one or more of:
    log circuitry;
    the user-portable electronic device;
    a module for the user-portable electronic device; and
    network apparatus in communication with the user-portable electronic device.

16. A method comprising:
    allowing for one or more of storage and searching of a user-searchable geographic-location log to facilitate subsequent location of one or more mobile electronic devices by a user without connection to the one or more mobile electronic devices, the user-searchable geographic-location log including at least the name or other identifier of the one or more mobile electronic devices, an indication of a last-known geographic location of the one or more mobile electronic devices, the time and date of the last-known geographic location of the one or more mobile electronic devices, and the transmission connection media used at the time of the last-known geographic location of the one or more mobile electronic devices, the user-searchable geographic-location log configured to allow for display of a user-searched last-known geographic location of the one or more mobile electronic devices;

the last-known geographic location of the one or more mobile electronic devices determined based on disconnection or loss of transmission connection between a user-portable electronic device and the one or more mobile electronic devices.

17. The method of claim 16, wherein the method further comprises:
determining the last-known geographic location of the one or more mobile electronic devices based on a range of transmission connection between the user-portable electronic device and the one or more mobile electronic devices.

18. A non-transitory computer readable medium comprising computer program code stored thereon, the computer readable medium and computer program code being configured to, when run on at least one processor, perform at least the following:
allowing for one or more of storage and searching of a user-searchable geographic-location log to facilitate subsequent location of one or more mobile electronic devices by a user without connection to the one or more mobile electronic devices, the user-searchable geographic-location log including at least the name or other identifier of the one or more mobile electronic devices, an indication of a last-known geographic location of the one or more mobile electronic devices, the time and date of the last-known geographic location of the one or more mobile electronic devices, and the transmission connection media used at the time of the last-known geographic location of the one or more mobile electronic devices, the user-searchable geographic-location log configured to allow for display of a user-searched last-known geographic location of the one or more mobile electronic devices;
the last-known geographic location of the one or more mobile electronic devices determined based on disconnection or loss of transmission connection between a user-portable electronic device and the one or more mobile electronic devices.

19. A system comprising:
an apparatus comprising:
at least one processor; and
at least one memory including computer program code, the at least one memory and the computer program code configured to, with the at least one processor, cause the apparatus to perform at least the following:
allowing for one or more of storage and searching of a user-searchable geographic-location log to facilitate subsequent location of one or more mobile electronic devices by a user without connection to the one or more mobile electronic devices, the user-searchable geographic-location log including at least the name or other identifier of the one or more mobile electronic devices, an indication of a last-known geographic location of the one or more mobile electronic devices, the time and date of the last-known geographic location of the one or more mobile electronic devices, and the transmission connection media used at the time of the last-known geographic location of the one or more mobile electronic devices, the user-searchable geographic-location log configured to allow for display of a user-searched last-known geographic location of the one or more mobile electronic devices, the last-known geographic location of the one or more mobile electronic devices determined based on disconnection or loss of transmission connection between a user-portable electronic device and the one or more mobile electronic devices;
transmission apparatus configured to establish transmission connection between the user-portable electronic device and the one or more mobile electronic devices; and
geographic-location determining apparatus configured to determine at least the last known geographic location of the one or more mobile electronic devices based on the disconnection or loss of transmission connection between the user-portable electronic device and the one or more mobile electronic devices.

20. The apparatus of claim 1, wherein:
the mobile electronic device is one or more of: a vehicle with a built-in hands-free kit, a peripheral device, a headset, a Bluetooth headset, a hands-free kit, a device capable of determining its geographic location, a master device, and a slave device; and wherein
the user portable electronic device is one or more of: a mobile phone, a laptop, a personal digital assistant, a device capable of determining its geographic location, a master device, and a slave device.

* * * * *